Feb. 16, 1926.

H. J. ZOTTEL 1,573,109

STABILITY AND STEERING DEVICE FOR AIRCRAFT

Original Filed July 5, 1916   5 Sheets-Sheet 1

H. J. ZOTTEL

1,573,109

STABILITY AND STEERING DEVICE FOR AIRCRAFT

Original Filed July 5, 1916   5 Sheets-Sheet 2

Feb. 16, 1926.

H. J. ZOTTEL

1,573,109

STABILITY AND STEERING DEVICE FOR AIRCRAFT

Original Filed July 5, 1916  5 Sheets-Sheet 4

Witnesses:
A. G. Kritch.
Florence Mallon

Inventor:
Herman J. Zottel

Feb. 16, 1926.

H. J. ZOTTEL 1,573,109

STABILITY AND STEERING DEVICE FOR AIRCRAFT

Original Filed July 5, 1916   5 Sheets-Sheet 5

Patented Feb. 16, 1926.

1,573,109

UNITED STATES PATENT OFFICE.

HERMAN J. ZOTTEL, OF MILWAUKEE, WISCONSIN.

STABILITY AND STEERING DEVICE FOR AIRCRAFT.

Application filed July 5, 1916, Serial No. 107,579. Renewed March 7, 1924.

*To all whom it may concern:*

Be it known that I, HERMAN J. ZOTTEL, a citizen of the United States, and a resident of Milwaukee, in the county of Milwaukee and State of Wisconsin, have invented certain new and Improved Stability and Steering Devices for Aircraft, of which the following is an exact and full description.

In stabilizing devices for aircraft heretofore known, the broad and underlying principle has been the restoration of the equilibrium; the main supporting element of aircraft provided with such devices must describe an irregular movement before the stabilizing element begins to actuate; in other words, the equilibrium of such aircraft must be disturbed and reestablished; it is evident that the principle of such devices is fundamentally wrong.

The object of the present invention is to maintain the equilibrium of the aircraft at all times; the stabilizing element actuates and adjusts the stabilizing planes to varying air conditions prior to the disturbance of the equilibrium of the aircraft; the aircraft itself never deviates from its regular course, the stabilizing planes counteracting any disturbing tendency of adverse air currents.

One of the objects of the invention is to provide means whereby the transverse stability of an aircraft may be automatically maintained.

A further object of the invention consists in providing means for automatically steering the aircraft with respect to elevation by maintaining a predetermined angle of flight.

A still further object of the invention consists in providing means whereby a certain horizontal course relative to the earth may be maintained and a certain predetermined point reached without the aid of distinguishing markings along the route and notwithstanding side wind.

A still further object is to provide indicating and signalling devices in connection with the automatic stabilizing and steering elements.

The object of my invention is also to provide simple and efficient apparatus of an inexpensive character for attaining the outlined results.

The invention embodies many other features of importance, which will be pointed out more particularly in the following description and defined in the appended claims.

Reference should be had to the accompanying drawings, forming part of this specification, in which similar characters of reference indicate corresponding parts in all the figures, and wherein.

Figure 1:
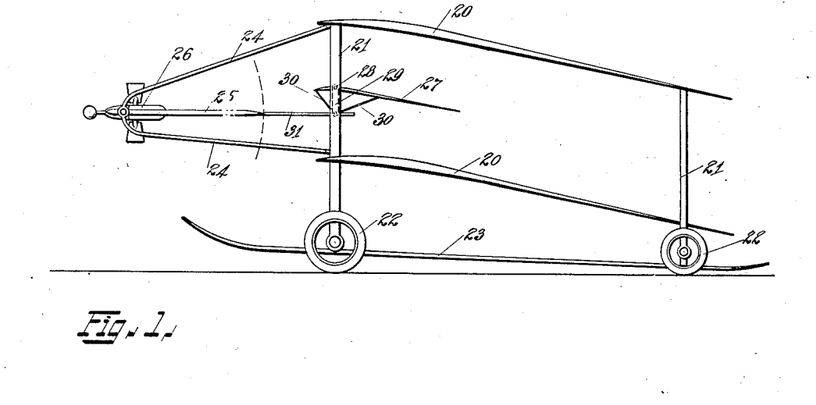
Figure 1 shows a side elevation of an embodiment of the invention for obtaining transverse stability and as applied to a biplane.
Figure 2:
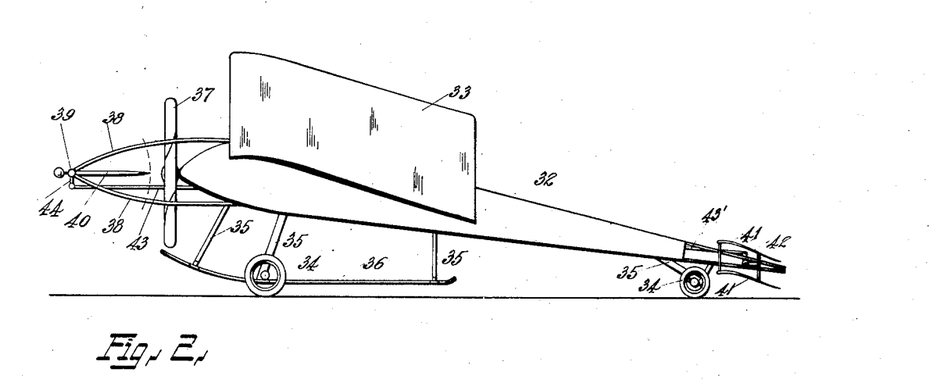
Figure 2 shows the same in modified form as applied to a mono-plane, for obtaining longitudinal stability.
Figure 3:
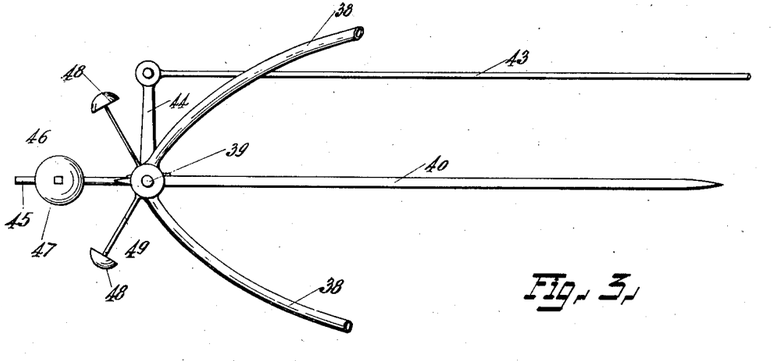
Figure 3 shows an enlarged side elevation of a device similar to that shown in Figure 2.
Figure 4:
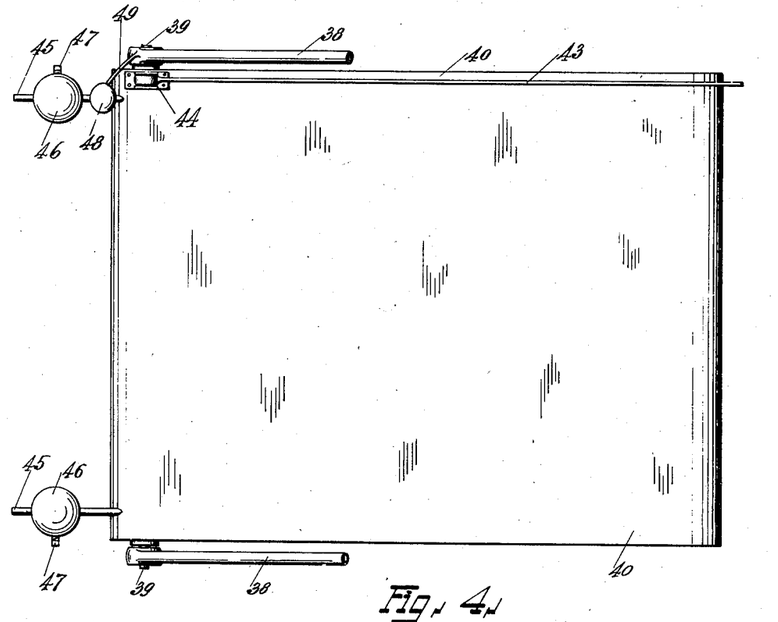
Figure 4 shows the plan view of Figure 3.
Figure 5:
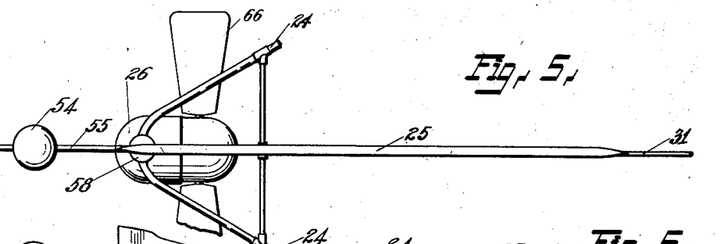
Figure 5 shows an enlarged side elevation of part of the device as applied to Figure 1.

Referring more specifically to Figures 2, 3 and 4 of the drawings, 32 shows the main body of a monoplane, which has the main planes 33 and the running gear 34 and suitable struts 35 for supporting the machine when on the ground; 36 are skids for retarding the momentum when alighting and 37 is the propeller from which the forward motion of the monoplane is derived.

Suitable outriggers 38 support at the pivots 39 the feeler-plane or antenna 40; the balancing planes 41 are pivotally supported from the main body 32; a suitable lever connection 42 and a rod 43 form an operative connection with the bifurcated bell crank 44 which is rigidly attached to the feeler-plane 40; 45 shows rods extending from the feeler plane forwardly to hold the counterbalancing weights 46 which may be adjusted by means of the set screws 47.

Bells 48 are supported by the rods 49 from the outrigger 38 and so positioned, that one of the weights 46 may also serve as a hammer for striking the bells, to caution the aviator of the approach of extremely violent and adverse air currents; the upper one of these bells may have a distinguishing sound from that of the lower one, as for example a lower pitch; this will besides serving as a warning signal, also tell the aviator whether the extremely violent gusts of wind tend to elevate or depress the forward part of the aircraft and he may accordingly apply proper corrective measures.

The operation of the apparatus described is as follows: Assume the monoplane to be flying in a horizontal course and the air currents coming in contact with the same of substantially horizontal direction; this will adjust the feeler-plane or antenna 40 in a horizontal line and accordingly also position the movable planes or rudders 41.

Assume now the air currents encountered should suddenly change from a horizontal direction to one having an upward tendency; this will instantly move the feeler-plane or antenna into alignment with the air current and in this case it would assume an upwardly inclined position; this motion of the feeler-plane will be transmitted through the bell crank 44, the rod 43 and the lever 42 to the rudders 41; these rudders will in this instance assume a greater angle of incidence and cause the tail end of the mono-plane to rise thus diminishing the angle of incidence of the main planes 33. All this may be timed so that by the time the air current which caused this adjustment reaches the main planes the same will already have the proper angle of incidence with respect to the air current in question. It may however be so timed that the adjustment of the rudders occurs at the instant of the air current striking the main planes, thus causing a slight rise of the monoplane bodily but maintaining its longitudinal position. Preferable to either of the two ways however is to time midway, thus causing only a very slight rise at the tail end of the aircraft and only a very slight bodily rise of the same.

This variation in timing may be readily accomplished by mounting the feeler-plane 40 a greater or less distance in front of the main planes 33. The speed of the monoplane must of course be considered when determining the proper location of the feeler-plane.

It may also be desirable to have a suitable arrangement whereby this distance may at all times have the proper relation to the speed of travel; this may be accomplished either manually or automatically by means of a suitable governor.

Being desirous of making the present application comparatively brief and simple the apparatus for obtaining this adjustment is not presented herewith.

The foregoing explanation of operation of the device referred to a horizontal flight of the aircraft. If the course of the aircraft should for example be a climbing one then a simple change in the relative angle between the feeler plane and the rudder will accomplish this by a suitable device of which Figure 10 may serve as an example.

Figure 10:
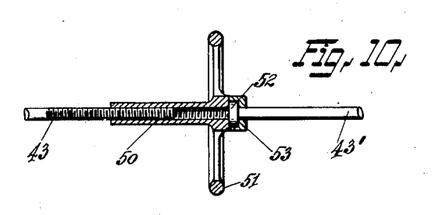
Figure 10 shows a device for manually adjusting the relation between the planes, parts of which are shown in cross section.

In this device 43 designates the rod forming the connection with the feeler-plane 40; the end of this rod has a threaded portion for engaging the threaded bushing 50 which is also provided with a handwheel 51; 43' designates the portion of the rod connected to the lever 42 for operating the rudders 41; the end of this rod is provided with a collar 52 which effects a suitable connection with the handwheel by the recessed cap 53.

When the handwheel 51 is turned it will cause a lengthening or shortening of the rod connection 43 and 43' and in consequence a different angle of inclination of the rudders 41 with respect to the feeler plane.

If the course of the aircraft should be a climbing one as previously assumed, the angle of incidence of the main planes must be increased; this can be accomplished by depressing the tail end of the machine; which in turn is brought about by diminishing the angle of incidence of the rudders and a shortening of the rod connection 43 and 43' by rotating the handwheel 51. The hand wheel 51 may also be used for manually pulling or pushing the rod 43 and 43' thereby increasing or decreasing the inclination of the rudders 41; this may be especially desirable when alighting.

While the form of apparatus illustrated by Figures 3 and 4 is herein described in connection with a monoplane it is obvious that same can be used on a biplane or any other form of aircraft. It is further obvious that it can be used for operating the ailerons or the vertical rudders of an aircraft.

This form of apparatus however is more particularly adapted to aircraft wherein the rudders or ailerons are pivoted in proximity to the center of pressure or where space is available for comparatively large feeler planes in order that sufficient power for operating the rudders may be derived. In aircraft wherein sufficient or suitable space is not available or where it is otherwise preferable the apparatus illustrated in Figures 1, 5, 6, 7, 8 and 9 may be employed.

Referring to these figures, 20 shows the main planes of a biplane suitably supported and braced by uprights 21, and resting upon the running gear 22; 23 shows the skids used in alighting to retard the forward motion of the machine; 24 shows a suitable outrigger pivotally supporting near its outer end the feeler plane or antenna 25; it also rigidly supports the plane shifting mechanism 26. Character 27 shows the balancing planes or ailerons as they are commonly applied and in which 28 is a pivot to permit movement thereof transversely to the line of flight of the aeroplane; 29 is a lever rigidly connected to the aileron, braced by cables 30 and forming a connection with the rod 31 and the plane moving mechanism 26.

The feeler plane, vane or antenna 25 is counterbalanced by the weights 54 which may be adjusted on the rods 55 by the set-screws 56, so that the vane may be balanced to swing freely and without restriction. The rod 57 is rigidly attached to the vane 25 and turns in bearings 58 on the outrigger 24; attached to rod 57 are levers 59 which provide bifurcated fulcrums for the links 60 which in turn connect with the sleeve 61; this sleeve is provided with an external groove 62 and adapted to slide over the bushing 63 which has an internal thread and may also form the housing 64; in the housing 64 are provided suitable bearings for shafts 65 of the propeller blades 66; to the ends of the propeller shafts 65 are attached levers 67 with ball-shaped ends 68 which project into the groove 62 of the sleeve 61. A screw 69 passes through the threaded bushing 63 and is supported near one end by a suitable member 70, which in turn is supported by the rod or rods 57; at the other end it is held by the member 71, which is attached to the outrigger 24. To reduce the air resistance and for purposes of protection a cover 72 may be provided to enclose the internal mechanism and form a continuation of the housing 64, the cover being of such dimensions as to telescope with the housing.

Figures 6, 7, 8, 9:
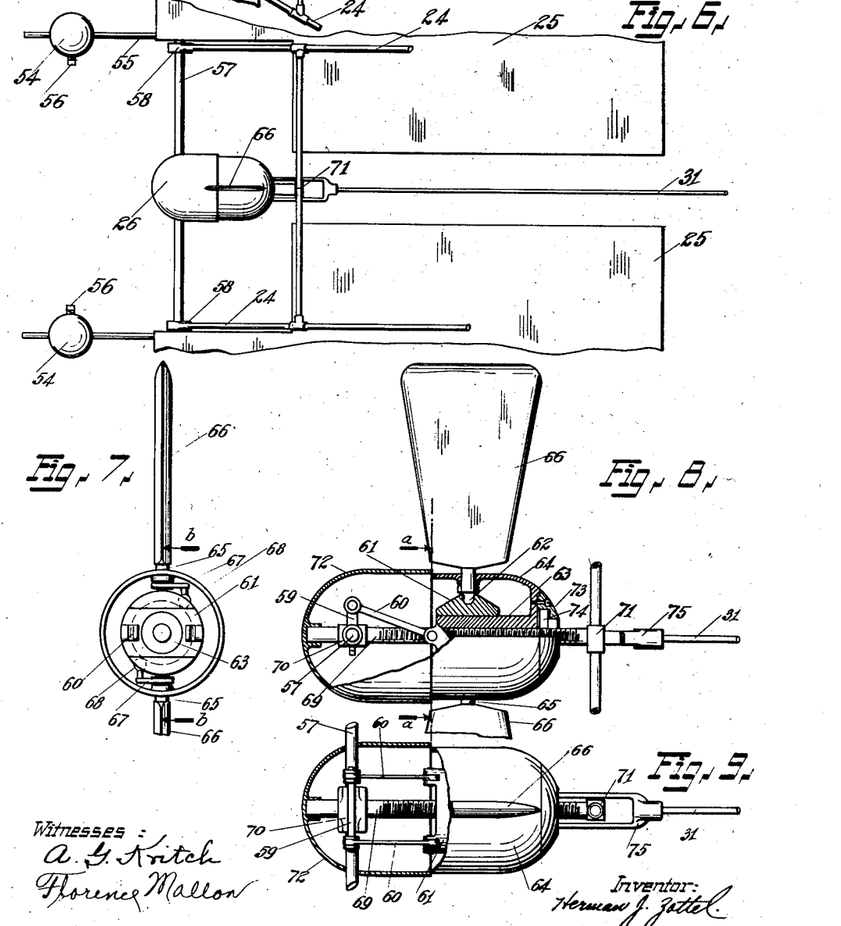
Figure 6 shows a plan view of the same, parts of the plane being broken away for convenience of illustration.
Figure 7 shows in detail a front elevation of the plane adjusting mechanism shown in Figures 5 and 6, partly in section through the line $a$—$a$ of Figure 8, to show the interior construction.
Figure 8 is a side elevation of the plane adjusting mechanism showing parts in cross section, through the line $b$—$b$ of Figure 7.
Figure 9 is a plan view of the same, also partly in cross section.

The housing 63 is provided with a cap 73 having a suitable recess for the reception of the collar 74 on the yoke piece 75. This yoke piece is then suitably connected with the rod 31; the rod 31 and the yoke piece 75 are non-rotatable.

The operation of this device is as follows: Suppose the aircraft to be traveling in a horizontal course and the air currents encountered to have a horizontal direction. The alignment of parts under such conditions will be as illustrated by the figures; the feeler-plane 25 will be horizontal, the propeller stationary, due to the blades being parallel to the axis of the propeller, and the ailerons 27 will have the proper angle of incidence for horizontal flight.

Now let a disturbing air current, for instance of a descending direction, strike the vane 25; the vane will at once align itself with the direction of the air current, will turn the rods 57, cause the levers 59 and 60 to push the sleeve 61 inwardly, and turn the levers 67 and the propeller blades 66; at this instant the propeller will begin to rotate, carrying with it the bushing 63, causing the same to move forward toward the cover 72, by means of the screw thread therein and the stationary screw 69; this movement of the housing will carry with it the yoke 75 and exert a pull on the rod 31 thereby increasing the angle of incidence of the aileron 27.

As the propeller and the housing rotate and wind up on the screw 69 the angle of the blades 66 gradually decreases, and when the center line of the shafts 65 and the center line of the groove 62 meet, the blades of the propeller will again be parallel to its axis and automatically stop the rotation thereof.

This condition will prevail so long as the disturbing air current continues in the original direction; should the disturbing air current cease and for instance a horizontal one take its place, the vane will align itself with the same, cause the shaft 57 to turn and effect a longitudinal movement of the sleeve 61, an angular position of the propeller blades, the rotation of the propeller in the reverse direction, and the return of the housing, the yoke, the rod and the aileron to the original position; then the rotation of the propeller is again automatically stopped.

Should the disturbing air current become more pronounced, the vane will cause a further adjustment of the aileron in precisely the same manner as in the first instance.

It should be noted that the time required for adjusting the aileron will always be proportional to the relative velocity of the aircraft to the surrounding air, since the speed of the propeller 66 is directly derived therefrom.

Consequently, by mounting the vane a certain distance in advance of the aileron the timing may be so adjusted, that the aileron is in the proper position for counteracting the tendency of a disturbing air current, when the same reaches the main planes.

It will also be noted, that the operation of this device is not dependent upon the operation of the engine of the aircraft and will be unhampered even after the engine is at a stop; for this reason this form of operating device is available for operation when gliding or at any other occasion when the motive power of the aircraft is unavailable.

If we now provide the aircraft with an aileron on each side and connect each aileron to a corresponding adjustment device, it will be observed that, if an air current exerts the same tendency on both vanes, the adjustment of both ailerons will be the same; if the tendency on one vane differs from that on the other, then each aileron will assume a position to correspond with this tendency and will correspondingly counteract the tendency of the adverse air currents.

An aircraft thus equipped will have automatic transverse stability and automatic longitudinal stability at all times.

If suitable means for altering the relative angle between the vane and the aileron, such as for instance shown in Figure 10, are provided, steering of the aircraft at any predetermined angle of flight may be automatically accomplished. In such an arrangement the aviator may for instance adjust a suitable hand-wheel until an indicator shows the proper adjustment effected; then no further attention need be paid to the steering of the aircraft; the vanes at once adjust the ailerons and maintain the desired inclination of the aircraft notwithstanding adverse air currents.

The efficiency of automatically steering an aircraft at a certain angle of flight is of course vastly increased if besides the ailerons an elevating rudder is employed.

In an arrangement of this kind the operating handle or wheel for the elevating rudder should be operatively connected with the devices shown in Figure 10, so they may be operated collectively.

The elevating rudder will then assist in keeping the aircraft at the proper angle of flight while the ailerons will counteract any disturbing tendency of air currents.

In an aircraft equipped with ailerons on the sides it may be advantageous if not necessary to employ some form of indication suitable for observation by the aviator.

Figures 11, 12, 13:
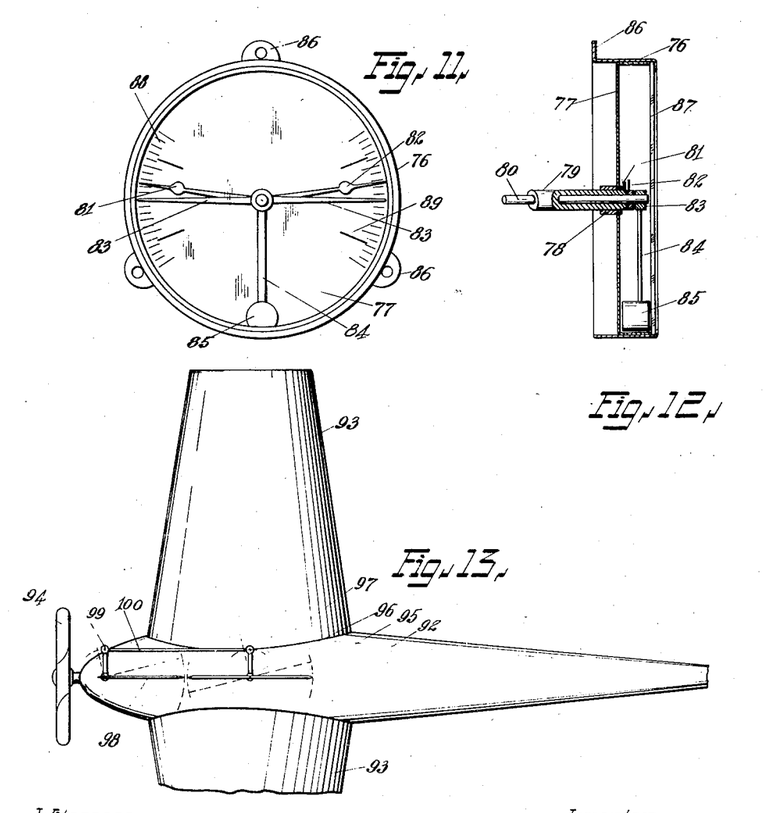
Figure 11 shows in elevation an indicator which may be used in connection with the stabilizing and steering devices.
Figure 12 is a central cross sectional view of the same.
Figure 13 is a plan view of part of a monoplane, showing the invention applied for automatically steering an aircraft in the horizontal plane.

Such an indicating device is shown in Figures 11 and 12, in which character 76 shows a suitable housing with an indicating dial 77 secured thereto; at 78 a suitable bearing is provided for the bushing 79 and the shaft 80; a pointer 81 is attached to the bushing 79 and a pointer 82 to the shaft 80; the shaft 80 is operatively connected to the vane, say for instance that on the right side of the machine when viewed from the aviator; the bushing 79 is operatively connected to the vane on the left side of the machine.

To indicate the transverse position of the aircraft a pointer 83 may be provided. This pointer may swing freely on the shaft 80 or may be otherwise pivoted. The pointer has an extension 84 and a weighted body 85 which serve the purpose of a pendulum and will keep the pointers 83 in a horizontal line.

The housing 76 of the indicator has suitable lugs 86 for attachment to the aircraft, while the dial and pointers may be covered by a glass 87.

The dial 77 is divided into suitable graduations 88, preferably giving the variations in the positions of the vanes at an increased ratio, to facilitate reading the indicator. Other suitable markings may appear on the dials, as for example at 89, for indicating the presence of air currents of an extremely violent character.

In operation the position of the pointers or hands 81 and 82 will at all times correspond to the position of the vanes, or for that matter the position of the ailerons, since the three elements are connected. The position of the pointers 81 and 82, as illustrated in Figure 11, would for instance indicate that both vanes, and both ailerons, are in an upwardly inclined position.

The position of the pointers 83, as illustrated, would indicate a transversely horizontal position of the aircraft.

Thus far the stabilizing and steering apparatus was described as applied to the ailerons for transverse stability and steering in the vertical plane; and to the elevator for longitudinal stability and steering in the vertical plane.

In the following paragraphs the device will be described as applied for automatically overcoming side drift of the aircraft that is, the sidewise movement of the craft relative to the earth due to a side wind commonly known as "drift" as caused by cross currents. Reference should now be taken to Figure 13, in which 92 designates the body of an aircraft and 93 the main supporting planes thereof; 94 is the propeller for driving the same. The stabilizer for overcoming side drift of the aircraft is shown at 95, being pivoted at 96 and having the lever 97 attached thereto; at 98 the feeler plane or antenna is shown, to which is attached the lever 99 which in turn forms a connection through the rod 100 with the lever 97 on the stabilizer.

The operation of this arrangement is as follows: When the air currents are in alignment with the longitudinal axis of the aircraft the feeler-plane 98 will assume a position as illustrated in full lines and the stabilizer will be inactive; should the air current however assume a direction different from that of the longitudinal axis of the aircraft, the feeler-plane will at once be diverted and place the stabilizer into an active position, as is for instance illustrated diagrammatically by dotted lines. The stabilizer then of course acts like an aeroplane, carrying the machine bodily against the adverse air current, consequently it prevents the cross currents diverting the aircraft from the intended course. If only one stabilizer is employed it should be placed to centralize the sidewise action thereof with the center of resistance sidewise of the aircraft, so that no turning effect occurs on the same. If considered preferable, two sets of feeler-planes and stabilizers may be employed and positioned at selected points.

It is evident that the device for manually changing the relation of the vane to that of the stabilizers as applied to the horizontal rudders and illustrated by Figure 10, may be employed for a like purpose when the vane is being used for controlling the vertical stabilizer.

Indicating devices, similar to those illustrated by Figures 11 and 12, may also be associated with the vertical vane so the aviator may at all times be apprised of the proper working of the vertical stabilizer or for the purpose of determining the direction of air currents encountered.

Thus this device overcomes the difficulty of reaching a certain preselected point in foggy weather or, when flying at a high altitude or in strange surroundings where distinguishing markings of the landscape are not available for guidance.

It should be noted that for guiding the course of an aircraft the compass alone is altogether unreliable and insufficient, because an air current striking the aircraft angularly to its direction of travel will bodily carry the same sidewise and although the direction as indicated by the compass may still be correct it is obvious that the aircraft may be carried a great distance off from the point of its destination.

In the device, as applied in Figure 13, the indicating as well as automatic counteracting means are provided.

Figure 14:
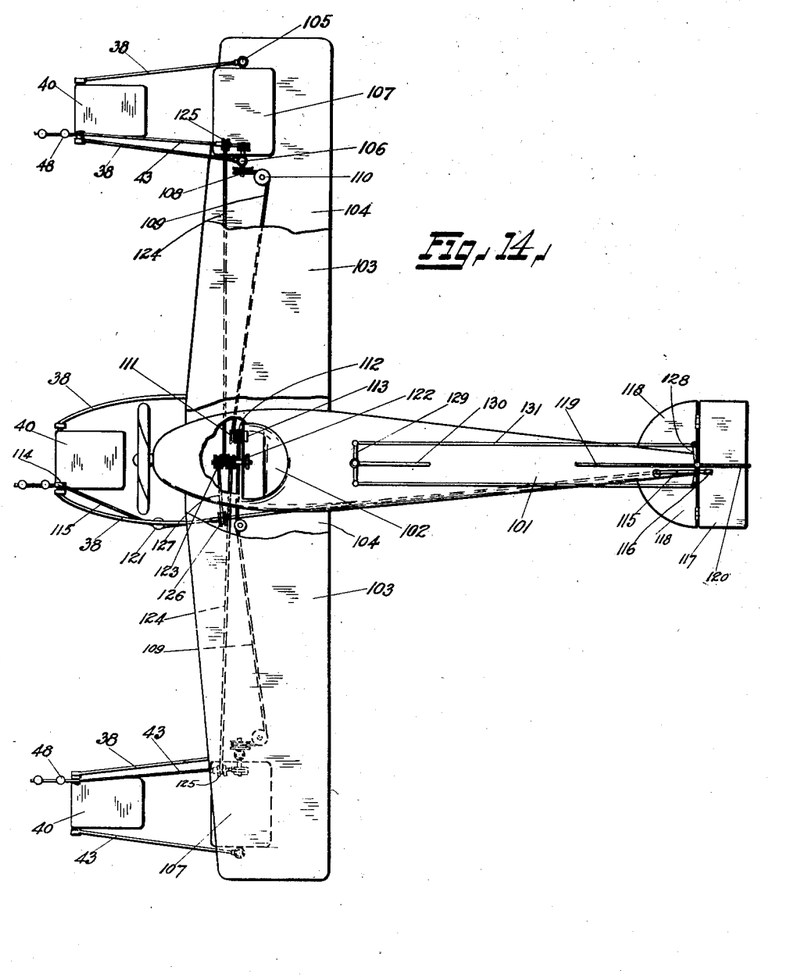
Fig. 14 is a plan view showing in combination the application of the invention to an aircraft for controlling the transverse stability, the longitudinal stability and for automatically maintaining a certain course in the horizontal plane; also the application of and connections for the device shown in Fig. 10. Portions of the upper main planes and a portion of the fuselage have been sectioned away to facilitate illustration. The view also shows the connections of the indicating device with the ailerons and the air-vanes.

In Fig. 14 the various devices illustrated by separate views and described under separate chapters, are shown in combination. The more particular object is to show the location of the devices, their relation to one another and the methods of connecting the same to obtain the desired results.

Character 101 shows the fuselage of an airplane, 102 the aviator's seat, 103 the upper planes with portions sectioned away to facilitate illustration and 104 shows the lower planes; 105 and 106 are vertical struts which support suitable pivots for the ailerons 107. The outriggers 38 which carry the air-vanes 40 are also attached to the struts 105 and 106. Characters 43 show the connections between the vanes and the ailerons.

The shaft which forms the pivot for the aileron 107 may have a suitable extension to carry a sheave 108 to which two cables 109 may be fastened at diametrically opposed points. These cables then pass over sheaves 110, or through other suitable guides, and their free ends are fastened to diametrically opposed points on sheave 111. A like arrangement exists for connecting the aileron to the left of the aviator's seat, excepting that these cables are fastened to sheave 112. It will be noted that sheave 111 is attached to shaft 80 and sheave 112 to bushing 79 of the indicating device 113 which is shown in detail in Figs. 11 and 12. Thus any movement of the vanes or the ailerons will be instantly transmitted to the pointers 81 and 82 of the indicating device, which will make observation by the aviator convenient and available at all times.

This it will be observed is quite pertinent, as without the indicating device, observation of the prevailing air currents and the proper operation of the ailerons especially when flying at night may not be convenient or possible.

For controlling the elevating plane the vane may be arranged in the central portion of the airplane forwardly of the main planes. Character 38 is a suitable outrigger for pivotally supporting the vane 40. From the double arm lever 114 on the vane 40, a cable 115 may be attached at diametrically opposed points and guided along the outrigger 38 and the fuselage of the airplane to a similar lever 116 on the elevating plane 117. The elevating plane is shown as being hinged to the horizontal fins 118, which are rigidly attached to the fuselage 101. At 119 the vertical fin is shown, to which is hinged the vertical rudder 120. Character 121 shows a sheave or other suitable guide for the cable 115.

It will be apparent that while the combination of ailerons and elevator both controlled by air-vanes is not absolutely essential, it is highly desirable to also provide the elevator and equip same with the air-vane. As has been pointed out in an earlier part of the description, the two ailerons operate entirely independently of one another, in exact relation to the prevailing air-currents on either side of the aircraft. Therefore if an air-current has a rising tendency on both sides of the aircraft, both ailerons will assume a lesser angle of incidence thus counteracting the tendency of the air current to elevate the main planes, as otherwise the longitudinal axis of the aircraft would assume a forwardly inclined position, which is equivalent to a disturbance of the equilibrium. This is a function ordinarily assigned to the elevator.

If an air current has an ascending tendency on one side and a descending one on the other, the aileron on the side of the ascending air current will assume a decreased angle of incidence while the one on the side of the descending air current will assume an increased angle of incidence. This is a function ordinarily and properly assigned to the ailerons, because it relates to the transverse stability.

The ailerons therefore not only perform the function of maintaining the stability of the aircraft transversely but also longitudinally. And the elevating rudder merely serves as an adjunct to aid the ailerons in maintaining the longitudinal stability. Being mounted far in the rear of the aircraft, or far removed from the center of gyration thereof, it possesses a very liberal measure of leverage and with the provision of the air-vane will counteract the smaller disturbances brought about by air currents or otherwise.

In Fig. 14 is also further illustrated a method whereby the relative angles of the ailerons to the air-vanes may be altered at the option of the aviator. Character 122 shows a suitable hand-wheel within convenient reach of the aviator, the forwardly extended shaft of which carries pulleys or sprocket wheels 123. From these pulleys or sprocket wheels, a cable or chain 124 is suitably guided toward each of the laterally disposed ailerons and makes connection with the pulleys or sprocket wheels 125. These pulleys or sprocket wheels take the place of the handwheel 51 of Fig. 10, which latter is more particularly adapted for changing the relation of the air-vane in connection with the rudder. All other parts remain as shown in Fig. 10.

If for instance the handwheel 122 is turned, the length of the operating rod 43 may be lengthened or shortened according as to whether the aircraft is desired to follow an ascending or descending course. As shown in Fig. 14 both ailerons are adjusted simultaneously and in the same direction and to the same extent. By providing two handwheel 122, however, each aileron can be adjusted independently of the other and in certain cases this may be the preferred form.

The pulley or sprocket wheel 123 may also carry provisions for adjusting or changing the angle of the elevating rudder 117 in respect to the vane 40 connected for controlling the same. In this arrangement 126 is again the device shown in detail in Fig. 10, with the exception that the handwheel 51 is replaced by a pulley or sprocket wheel. Character 127 is the cable or chain for driving the wheel 126. The drawing shows the change of relation of the elevating rudder dependent upon a change of the ailerons. It will however be obvious that the elevating rudder may be changed independently by providing a separate hand wheel and shaft 122.

Fig. 14 further shows the combination of an air-vane controlled vertical rudder with the vane controlled ailerons and the vane-controlled horizontal rudder. Character 120 shows the rudder hinged to the vertical fin 119. Attached to the rudder 120 are arms 128 and similar arms 129 are provided on the air-vane 130. Cables or rods 131 form a connection between the extremities of the arms 128 and 129.

This connection is made adjustable by a device similar to that shown in Fig. 10, and located within convenient reach of the aviator. Character 51$^b$ designates the handwheel which in this case is secured to the shaft 43 near the forward end, while the other end of the rod is provided with a screw thread. This screw thread engages a female threaded bushing 51 which is provided with pivots to permit swiveling but not rotation thereof, and is held by lever 130$^b$ which in turn forms a solid connection with the air-vane 130; the free end of the shaft 43 is held to the lever 129$^b$ in such fashion as to permit its rotation but not a lengthwise displacement. Lever 129$^b$ then is connected to form a solid engagement with the arms 129. Shaft 43 is provided with suitable bearings or guides, which permit rotation as well as lengthwise movement thereof.

When the handwheel 51$^b$ is rotated, the threaded portion of the shaft 43 will lengthen or shorten the distance between levers 129$^b$ and 130$^b$, according as to whether it is desired to impart a right or left hand inclination to the air-vane 130.

This adjustment permits the rudder 120 to remain in alignment with the longitudinal axis of the aircraft, while the air-vane 130 may assume an angular position thereto, according to the prevailing cross wind. If this adjustment were not provided, then the air-vane would keep the rudder in an active position until the aircraft would be steered directly into the face of the wind.

The air-vane and the rudder, when so adjusted, will remain inactive as long as the general direction of the cross current remains the same. Minor variations in direction and intensity of the general air current occur frequently and in quick succession due to the "internal work of the wind" and these cause different position in the air-vane and the rudder, tending to compensate for the otherwise resulting deviation of the aircraft from the intended course.

Without the automatically controlled rudder, the aviator must constantly correct for these numerous minor changes. With the automatically controlled rudder he need only adjust the air-vane when a change in the general direction of the wind takes place.

It will be noted, that the action of the vertical rudder (Fig. 14) is entirely different and independent from that of the vertical stabilizer (Fig. 13). The action of the air-vane controlled vertical rudder tends to keep the longitudinal axis of the aircraft pointing in a predetermined direction of the compass. The action of the air-vane controlled vertical stabilizer tends to correct for side drift as the result of the side pressure exercised by cross currents against the side of the aircraft.

The diagonal movement of the aircraft from its true course and as caused by this side pressure is commonly called "side drift". Wherever this term appears in the description or claims of this application, it is meant to indicate this diagonal deflection of the aircraft from its prescribed course, with reference to the ground.

Attention is also directed to the vertical rudder 120 of Fig. 14, which is shown as an unbalanced plane, while the vertical stabilizer 95 of Fig. 13 is shown as a balanced plane. This arrangement, while my preferred form, will in no way bind me to adhere to this particular arrangement. I may employ a balanced or unbalanced plane for either or both, the stabilizer 95 and the rudder 120, without departing from the scope of the invention.

The stabilizing and steering devices herein described are equally effective for restoring the equilibrium of the aircraft if the disturbance should have a source other than that of adverse air currents. For instance, moving about by the aviator or any other cause for changing the normal position of the center of gravity may condition an upwardly or downwardly inclined position of the aircraft. It will be apparent that if this occurs a change in the relation of the vane to the aircraft takes place, which in consequence will also cause the automatic adjustment of the stabilizing or steering elements. It should be noted that this will be in exact relation to the degree of deviation of the aircraft, and will again restore the original direction and the equilibrium thereof.

From the foregoing description, taken in connection with the drawings, the construction, application and mode of operation of my invention will be readily understood, and the advantages, correctness of principle, and indispensability thereof will be manifest. It will also be apparent that apparatus, as outlined in the aforegoing description, are absolutely essential for the full military and commercial exploitation of this new form of locomotion.

For instance, the source of power for operating the rudders or other movable planes was illustrated and described as being derived from the forward motion of the aircraft by a suitable propeller. It is to be understood however that I may employ any other source of power for this purpose, such as a source of electrical energy, or a suitable driving mechanism coupled to the engine of the aircraft, or a cylinder wherein the piston is operated by fluid or air pressure; in each instance however the feeler-plane, antenna or vane will control the position of the movable planes, although indirectly.

Further, that the vane may control stabilizing elements other than planes; movable weights or propellers may for instance be employed in place thereof, and I wish it to be understood that I shall consider any stabilizing agent, regardless of form, when controlled by a feeler plane or antenna as within the scope and meaning of the invention presented herewith.

Although the illustrations and descriptions of the invention as herein presented for example are limited to aircraft known as the heavier-than-air type, it is evident that the devices may also be used in connection with lighter-than-air type machines, or combinations of the two.

What I claim as new and desire to secure by Letters Patent is:

1. A vertical steering device for aircraft comprising main supporting planes and steering elements disposed on opposite sides of the craft, the steering elements consisting of movable planes disposed so that the center of pressure thereon is located forwardly of the center of pressure of the main supporting planes, air-vanes mounted forwardly of said planes, and an operative connection from said air-vanes to the movable planes, the air-vanes being actuated by air currents of ascending or descending direction whereby a certain horizontal position of the craft may be automatically maintained by subjecting the movable planes only to different angles of incidence.

2. A vertical steering device for aircraft comprising main supporting planes and steering elements mounted on opposite sides of the craft, the steering elements consisting of movable planes having their center of pressure located forwardly of the center of pressure of the main supporting surfaces, air-vanes mounted forwardly of said planes and adapted for oscillation caused by a difference in air pressure against their sides and in a substantially vertical direction, operative connecting means for the moving of the movable planes in accordance with the movements of the air-vanes, and adapted for so timing the said movement that the movable planes are set for neutralizing the effects of said difference in air pressure while contacting therewith.

3. An aircraft having main planes and automatic means for maintaining its transverse and the longitudinal stability, said means consisting of ailerons connected for operation by air-vanes mounted forwardly thereof, and of an elevating rudder connected for operation by an air-vane positioned forwardly of the same, the actuation of the ailerons being timed to occur, approximately, while variable air currents contact therewith, and the actuation of the rudder being timed to occur approximately while variable air currents contact with the main planes, whereby the latter are prevented from participating in the movements of the air-vanes.

4. In an aircraft, an air feeler element, stabilifying elements and a servo-motor for actuating the stabilifying elements and comprising a propeller with adjustable blades normally set parallel to its axis, operating means controlled by the feeler element for inclining the blades of said propeller to cause rotation thereof, and means for converting said rotational movement into movement for actuating the stabilifying elements.

5. In an automatic stability device for aircraft, a movable plane for maintaining said stability, an air-vane adapted to actuate by atmospheric impulses, and a servo-motor comprising an outrigger, a threaded member supported thereby, a second threaded member in rotatable engagement with the first threaded member, a bushing with an annular groove slidable lengthwise of said threaded members, bearing means carried by the second threaded member, propeller blades rotatively carried by said bearing means, bell cranks provided at the inner end of the propeller blades and in engagement with the annular groove, of the bushing, means operative by movement of the air-vane for sliding said bushing lengthwise of the threaded members, whereby an inclined position may be imparted to the propeller blades for causing rotation of the second threaded member in relation to the first threaded member, and the end movement so derived being utilized for operating said movable planes.

6. In an automatic stability and steering device for aircraft, a stabilizing and steering element, a vane element responsive to the action of air currents thereon, and a propeller having adjustable blades, and comprising in combination a threaded shaft, a housing with an internal thread for engaging said shaft, and being provided with bearings for holding the blades of the propeller, bell cranks attached to the blades and projecting inside of the housing, a member with an annular groove for engaging the bell cranks, and means operative by movement of the vane-element for sliding said member lengthwise of the housing, thereby adjusting the blades of the propeller from a position parallel to the shaft to a position angular thereto, other connecting means from the propeller to the stabilizing and steering element to effect a change in the action thereof when the propeller is caused to rotate by the adjustment of its blades through the vane element.

7. In an automatic stability and steering device for aircraft the combination of a vane, a movable plane, a propeller having adjustable blades, and comprising a threaded member non-rotatively supported by an outrigger, a second threaded member in rotatable engagement with the first threaded member and suitably hollowed to provide a housing, propeller blades supported by the housing and adapted for variated inclination thereto, bell cranks on the inner end of the propeller blades and projecting inside of the housing, a bushing slidable lengthwise of the housing and engaging the bell cranks, connections from the vane for sliding the bushing to set the blades of the propeller to start or stop the rotation thereof, the rotation of the propeller in turn altering the position of the movable plane in accord with the position of said vane.

8. In an automatic stability and steering device for aircraft a vane, a propeller having adjustable blades and being adapted for clock-wise and anti-clockwise rotation, said propeller comprising a suitable housing having an internal thread, means carried by the housing to hold the blades of the propeller, bell cranks attached to the blades, a bushing with a circumferential groove for engaging the bell cranks and being slidable lengthwise of the housing and inside thereof, a threaded shaft in engagement with the internal thread of the housing and held non-rotatively by an outrigger, and connecting means from the vane for starting or stopping the rotation of said propeller by adjustment of its blades, a movable plane for counteracting the tendency of adverse air currents and operative connecting means for regulating the position of the movable plane by rotation of said propeller and in accord with the position of said vane.

9. In an automatic stability and steering device for aircraft the combination of a vane, a movable plane, a propeller having adjustable blades, said propeller comprising a suitable casing with means for supporting the blades on the exterior thereof, crank means for turning the blades to different angular positions located on the interior of the casing and being operable by the vane, a threaded shaft supported from an outrigger and being in engagement with an internal thread in the casing, whereby, when the vane turns the propeller blades to an active position, the casing is being rotated by the blades and an endwise movement caused thereby for operating the movable plane, together with means whereby the blades of said propeller are automatically returned to a non-active position at a predetermined instant.

10. In an aircraft, the combination with movable planes for the lateral control thereof, of an indicating device comprising a dial, a pendulum controlled pointer having its axis longitudinally of the aircraft, and of pointer hands operable in connection with said movable planes, and registering with said dial and the pendulum controlled pointer.

11. In an aircraft means for maintaining the lateral balance thereof, an indicating device associated therewith and comprising the combination of air-vanes, a suitable dial, pointer hands to register therewith, and operative connection from the air-vanes to the pointer hands, and a pendulum controlled index hand for registering with the dial and the pointer hands.

12. In an aircraft, an indicating device associated with the lateral controls thereof, and comprising in combination, a stationary graduated dial, a pendulum controlled pointer to register therewith, air-vanes controlled by a difference in air pressure against their sides, and pointer hands operatively connected with each of the air-vanes and registering with the dial and the pendulum controlled pointer.

13. In an aircraft, an automatic stability device consisting of a movable plane and a feeler-plane mounted on each side of the longitudinal axis of the aircraft, operative connecting means from the feeler-planes to the movable planes, an indicating dial having two scales and two pointers, one of the pointers operatively connected to the feeler-plane on one side of the aircraft and the other pointer operatively connected to the feeler-plane on the other side of said aircraft, thereby apprising the aviator of the relative positions of the said feeler-planes.

14. An aircraft having main planes, propelling means, adjustable planes, feeler-planes, an indicating dial, the indicating dial to have scales with means associated therewith and comprising a dial with graduations, pointers registering therewith, operative connections from the feeler-planes to the pointers and gravity controlled indicating means arranged to show the position of pointers relatively thereto.

15. An aircraft having main planes, propelling means, adjustable planes, feeler-planes and an indicating dial, the indicating dial operatively connected to the feeler-planes and to have suitable graduations and pointers for indicating the position of the feeler-planes and the direction of air currents encountered thereby, together with other signalling means to apprise the aviator when the feeler-planes encounter extremely violent and adverse air currents.

16. An aircraft having stabilizing and steering elements, vanes adapted to be responsive to the varying directions of air currents in contact therewith, indicating pointers associated with the vanes, other indicating means for showing the transverse position of the aircraft for the purpose of showing the relation between the transverse position of the aircraft and that of the vanes.

17. In an aircraft having lateral controls, an indicating device, comprising in combination, air-vane means, a stationary dial, movable index means controlled by gravity, and a pointer connected to and being operable by movements of said air-vane means to show its relation to the dial and the gravity controlled index.

18. In an aircraft having lateral controls, an indicating device comprising in combination, air-vane means responsive to angular air movements, movable index means operable in connection therewith, a movable pointer controlled by gravity and a stationary dial to register with said index means and said gravity controlled pointer.

19. A signalling apparatus for aircraft, comprising an air-vane for testing the air currents immediately in front of said craft, signalling bells associated therewith and adapted to give an audible signal when air currents move the air vane to one of its extreme positions of oscillation.

20. A signalling apparatus for aircraft, comprising an air-vane for testing the air currents immediately in front of said craft, signalling bells associated therewith and adapted to give an audible signal when the oscillations of the air-vane reach an abnormal degree.

21. An aircraft having adjustable planes, a feeler-plane disposed on each side of the longitudinal axis of the aircraft and signalling means, the signalling means to consist of two bells of different tune associated with each feeler plane and adapted for sounding by violent oscillation thereof the difference in tune to apprise the aviator as to the direction of extremely violent adverse air currents encountered by the feeler-planes.

22. In an aircraft a vertical rudder located near the end thereof, an air-vane connected for operating the rudder, manually operative means capable to set the air-vane into alignment with the general direction of cross currents, while the rudder may remain set in alignment with the longitudinal axis of the aircraft, for the purpose specified.

23. In an airplane control, in combination, a control plane, a feeler vane remote from the centers of gravity, support, and wind resistance, and an air-turbine for adjusting said control plane in response to movement of said feeler vane substantially without loading the feeler vane, whereby the feeler vane exerts no direct controlling effect on the airplane.

24. In an airplane control, in combination, an elevator plane, a horizontal feeler vane in front of the airplane, and an air-turbine for adjusting said elevator plane in response to movement of said feeler vane substantially without loading the feeler vane, whereby the feeler vane exerts no direct controlling effect on the airplane.

25. In an airplane control, in combination, a rudder, a vertical feeler vane, a high fin adjustable to pull laterally, substantially above the center of gravity and connections independent of said rudder between said vane and fin, for maintaining lateral equilibrium in side gusts without affecting the directional control of the machine.

26. In an airplane control, in combination, a vertical feeler vane, a high fin adjustable to pull laterally substantially above the center of the gravity, and connections between said vane and fin for adjusting said fin to maintain lateral equilibrium in side gusts.

27. An aircraft having a main body, a movable plane controlling the longitudinal position thereof during flight substantially without affecting the speed or lift, an air vane positioned forwardly of the body, and an air-turbine forming an operative connecting means from the air vane to the movable plane, whereby the latter is automatically timed to move to positions tending to forestall a disturbance of the normal horizontal position of said aircraft by air currents of a direction different from said horizontal position.

28. An aircraft having a main body, an elevator plane movable for controlling the longitudinal position of the aircraft during flight, substantially without affecting the speed or lift, an air vane normally held parallel to the horizontal position of the aircraft, and an air-turbine controlled by said air vane to adjust and time the operation of said elevator plane to prevent a disturbance of the horizontal position of the aircraft.

29. An aircraft having a main body, an elevator plane for controlling the horizontal position of the aircraft, a balanced air vane substantially parallel with the body during flight in still air, and pivotally movable by air currents, and an air-turbine actuated by the air-vane for timing the movement of the elevator plane for anticipating and preventing movement of said aircraft from its normal horizontal flying position.

30. In an aircraft, a body, a plane having corrective movement relative to said body, an air vane pivotally balanced near its forward edge and positioned forwardly of the body, and an air-turbine for forming an operative connection for corrective movement of the plane solely because of the pivotal movement of the air vane.

31. In an aircraft, a body, an elevator plane for corrective movement relative to the body, an air vane pivotally balanced near its forward edge and positioned forwardly of the body, an air-turbine for converting the light impulses upon the air-vane into forceful corrective adjustments of the elevator plane.

In witness whereof, I hereunto subscribe my name this 1st day of July A. D. 1916.

HERMAN J. ZOTTEL.